Figure 1:
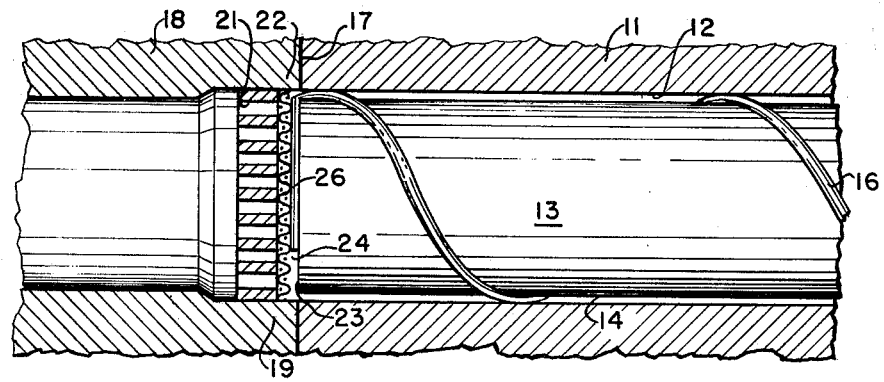

June 8, 1965  J. LOWE  3,187,382

EXTRUSION APPARATUS

Filed Sept. 16, 1963

INVENTOR
JAMES LOWE

BY

HIS AGENT 3,187,382
EXTRUSION APPARATUS
James Lowe, Orange, Calif., assignor, by mesne assignments, to Anaconda Wire and Cable Company, a corporation of Delaware
Filed Sept. 16, 1963, Ser. No. 309,051
6 Claims. (Cl. 18—12)

My invention relates to apparatus for the extrusion of plastic materials subject to scorching and particularly to a screw comprised in such apparatus.

In the extrusion of plastic materials at high temperatures and pressures, any material that does not pass through the extruder, but remains stagnant in some blind spot within the apparatus, will be subject to scorching or thermal degradation the effect of which may be progressive. Extrusion apparatus, such as that employed for insulating electrical conductors, is normally provided with a screen through which plastic material is forced by the pressure of a fluted screw, in its passage to an extrusion die. The screen serves a dual purpose of screening out foreign particles, and creating a back pressure within the extrusion cylinder. When the plastic material scorches, the scorched particles are caught by the screen and block the passages thereof. If there is enough scorched material the extrusion operation must needs come to a halt.

The space within an extrusion apparatus wherein the flow of plastic material is most apt to stagnate and become scorched, is at the discharge end of the screw at the entrance to the screen. Extrusion screws intended for such materials as semirigid polyvinylchloride, which are known to be subject to scorching, have very shallow flutes so that there is little radial distance between the surface of the root and the walls of the cylinder wherein stagnation might occur. But, under these circumstances, the flow of material takes place in a narrow annular area close to the cylinder walls with no steady flow at the center of the screen opposite the root of the screw. It is known to have flat-nosed screws where the cylindrical surface of the discharge end of the screw is close to the screen and exerts a frictional force on material ahead of it. This friction, however, does not force all the plastic through the screen but merely rotates it within the stagnant space where the continued exposure to the high temperature within the extruder causes it to scorch.

I have discovered that if the flat surface normal to the axis of my screw is provided with an axially projecting ridge extending from the flat surface substantially to the screen, this will push any trapped material into the flow paths of material being urged forward by the rotation of the flutes and no stagnation will take place. My ridge is at least as long as a radius of the root section and in the form of a secant across the flat surface, cutting a radius normal to the secant at a point not greater than half the radius from the center.

A more thorough understanding of my invention may be gained from a study of the appended drawing.

Figure 2:
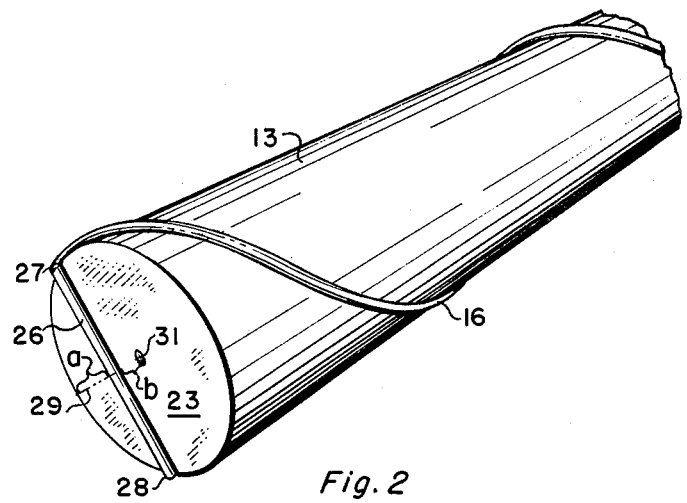

In the drawing:
FIGURE 1 is a partial section of the discharge end of my extrusion apparatus leading into the cross-head.
FIGURE 2 is a perspective of the discharge end of the screw of my invention.

In the drawing an extrusion cylinder 11 has a cylindrical inside bore 12 into which is fitted a screw 13. The cylinder can be heated and cooled by known means, not shown, and is normally operated at a temperature high enough to maintain the insulating material extrudable at the pressures exerted by the screw. These temperatures are harmless to the plastic for limited exposures but will cause scorching or degradation of any material that remains stagnant, instead of flowing through the extruder.

The screw 13 has a cylindrical root 14 which fills the bulk of the cylindrical bore 12. From this root 14 there projects radially a helical flute 16 which has a very close clearance to the cylindrical bore 12. A discharge end 17 of the cylinder 11 terminates in an extrusion head 18 which supports a screen pack 19 comprising a perforated backing plate 21 and a screen 22. The screw 13 terminates in a flat cylindrical surface 23 normal to the axis of the screw and parallel to the screen 22. Between the screen 22 and the surface 23 there is a space 24 which is filled with the plastic material being extruded. A ridge 26 extends as a secant across the face 23 from a point 27 where the ridge 16 terminates to a point 28 on the surface of the root 14. If a radius indicated by a broken line 29 is drawn from a center 31 of the surface 23 normal to the chord or secant made by the ridge 26 it will be divided into two segments, $a$ and $b$, in such a manner that $a$ is no smaller than $b$. If, however, the ridge 26 is in the form of a diameter passing through the center 31 it will not have the desired effect of pushing plastic material out of the space 24 but will merely rotate it indefinitely within the said space. I have found that when the distance $a$ is slightly greater than $b$, the material in the space 24 is kept in motion in such a manner as not merely to rotate but to advance into the stream of flow through the screen 22 and any stagnation and subsequent scorching is avoided even when the extrusion apparatus is being used for semi-rigid polyvinylchloride.

In using my improved apparatus the procedures to be followed are those that are well known to the extrusion art, the benefits accruing as a result of the improvement in my apparatus rather than any change in the known method.

I have invented a new and improved extrusion apparatus for which I desire an award of Letter's Patent.

I claim:
1. A screw for extruding plastic material subject to scorching during extrusion comprising:
 (A) a cylindrical root,
 (B) a shallow helical flute extending radially from said root,
 (C) a flat circular surface terminating the discharge end of said screw
  (a) said surface being normal to the axis of said screw, and
 (D) a ridge projecting axially from said surface
  (a) in the form of a chord across said surface appreciably distant from the center of said surface.
2. A screw for extruding plastic material subject to scorching during extrusion comprising:
 (A) a cylindrical root,
 (B) a shallow helical flute extending radially from said root
  (a) said flute terminating at the discharge end of said screw,
 (C) a flat circular surface terminating the discharge end of said screw
  (a) said surface being normal to the axis of said screw, and
 (D) a ridge projecting axially from said surface
  (a) in the form of a chord across said surface
  (b) extending from said flute, and
  (c) spaced an appreciable distance from the center of said surface.
3. A screw for extruding plastic material subject to scorching during extrusion comprising:
 (A) a cylindrical root,
 (B) a shallow helical flute extending radially from said root,
 (C) a flat circular surface terminating the discharge end of said screw

(a) said surface being normal to the axis of said screw, and
(D) a ridge projecting axially from said surface
(a) in the form of a chord acoss said surface
(1) cutting a radius nomal to said chord at a point not greater than half said radius distant from the center of said surface.

4. Apparatus for extruding plastic material subject to scorching during extrusion comprising:
(A) an extrusion cylinder having a discharge end,
(B) a material advancing screw within said cylinder comprising
(a) a cylindrical root,
(b) a shallow helical flute extending radially from said root,
(c) a flat circular surface terminating the discharge end of said screw
(1) said surface being normal to the axis of said screw,
(d) a ridge projecting axially from said surface in the form of a chord appreciably distant from the center of said surface, and
(C) screening means mounted across the discharge end of said cylinder
(a) parallel to and spaced from said surface,
(D) said ridge extending substantially from said surface to said screening means
whereby plastic material is prevented from remaining between said surface and said screening means.

5. The apparatus of claim 4 wherein said ridge cuts a radius normal thereto at a point not greater than half said radius distant from the center of said surface.

6. The apparatus of claim 5 wherein said flute terminates at the discharge end of said screw and said ridge extends from said flute.

References Cited by the Examiner
UNITED STATES PATENTS

| | | | |
|---|---|---|---|
| 2,291,212 | 7/42 | Clinefelter. | |
| 2,576,444 | 11/51 | Clinefelter | 18—13 |
| 2,595,210 | 4/52 | Clinefelter | 18—14 |
| 2,878,512 | 3/59 | Davis | 18—12 |
| 2,897,541 | 8/59 | Orsini. | |
| 3,018,516 | 1/62 | Clinefelter | 18—12 |
| 3,078,514 | 2/63 | Bray | 18—12 |

MICHAEL V. BRINDISI, *Primary Examiner.*